United States Patent
Gass et al.

(10) Patent No.: US 7,801,113 B2
(45) Date of Patent: Sep. 21, 2010

(54) DATA PROCESSING SYSTEM FOR SETTING UP COMMUNICATIONS BY SELECTING USER TERMINALS ACCORDING TO THEIR ACCESSIBILITY

(75) Inventors: Raymond Gass, Bolsenheim (FR); Michel Le Creff, Vigny (FR)

(73) Assignee: Alcatel, Paris (FR)

( * ) Notice: Subject to any disclaimer, the term of this patent is extended or adjusted under 35 U.S.C. 154(b) by 1889 days.

(21) Appl. No.: 10/742,788

(22) Filed: Dec. 23, 2003

(65) Prior Publication Data
US 2004/0136363 A1 Jul. 15, 2004

(30) Foreign Application Priority Data
Dec. 24, 2002 (FR) .................................. 02 16618

(51) Int. Cl.
*H04L 12/66* (2006.01)
(52) U.S. Cl. .................................. 370/352; 379/201.01
(58) Field of Classification Search ................. 370/352, 370/254, 259; 379/201.01, 202.01, 265.02
See application file for complete search history.

(56) References Cited

U.S. PATENT DOCUMENTS

| 7,035,923 B1 * | 4/2006 | Yoakum et al. ............. 709/224 |
| 7,139,797 B1 * | 11/2006 | Yoakum et al. ............. 709/204 |
| 7,227,937 B1 * | 6/2007 | Yoakum et al. ........ 379/201.01 |
| 7,257,218 B2 * | 8/2007 | Yoakum ................. 379/265.01 |
| 7,379,543 B2 * | 5/2008 | Hariri et al. ............ 379/201.01 |
| 7,596,131 B1 * | 9/2009 | Volftsun et al. ............. 370/352 |

FOREIGN PATENT DOCUMENTS

| EP | 0 872 998 A1 | 10/1998 |
| WO | WO 02/075495 A2 | 9/2002 |

* cited by examiner

*Primary Examiner*—William J Deane
(74) *Attorney, Agent, or Firm*—Sughrue Mion, PLLC

(57) ABSTRACT

A data processing system is dedicated to one or more calling users, and comprises (i) storage means (Mi), suited for storing information data indicative of one or more communication addresses of communication terminals (Ci,Ti,FTi) used by the calling user (Ui), and an accessibility status of such calling user through each one of said terminals (Ci,Ti,FTi), (ii) interfacing means (Ii), allowing the calling user (Ui) to request the setting-up of a communication with at least one called user (Uj), and (iii) management means (Gi) capable of negotiating with another data processing system (Dj), dedicated to the called user (Uj), and according to at least the information data stored in their respective memorization means (Mi, Mj), the set-up of the communication, requested by the calling user (Ui) between two terminals likely to be respectively accessed by the calling user (Ui) and the called user (Uj).

23 Claims, 1 Drawing Sheet

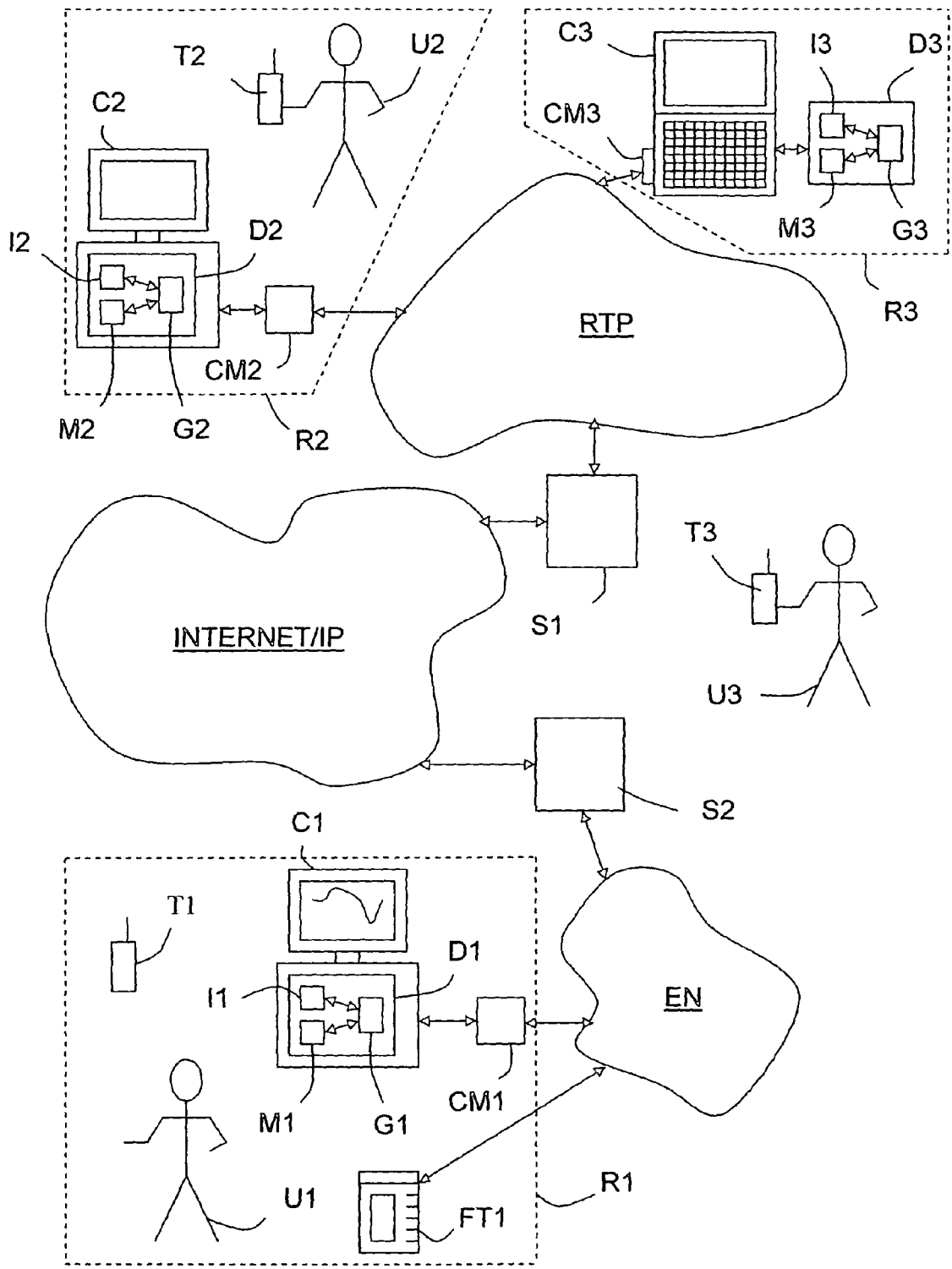

DATA PROCESSING SYSTEM FOR SETTING UP COMMUNICATIONS BY SELECTING USER TERMINALS ACCORDING TO THEIR ACCESSIBILITY

The invention relates to a method for exchanging data between communication terminals within a communications network, and more particularly for setting up communications between user terminals.

In the field of telephony, the callers' ultimate request is to have the ability to reach the called parties as fast as possible, regardless their respective location and their respective communication terminals. Now, due to (i) the coexistence of terminals of different types (such as, for example, fixed or mobile telephony, Internet telephony, transmission of text, voice, fixed images, video, or multimedia data), and generally connected to networks of different types, and (ii) the increasing mobility of individuals, setting up a communication between a caller and a called party may turn out to be complex and tedious.

In case of an unfruitful attempt, the caller may be forced to go through directories, and to make one or more communications in order to find out the communication address of the terminal at which he is likely to reach the called party. It may also force the caller to use a terminal of a different type from the one he used initially. Moreover, once the connection is established between a calling terminal and a called terminal, there is no guaranty that the caller can transmit data to the called party, e.g. when their respective terminals offer different types of services.

In order to avoid such situation, it has been proposed to improve call control systems, by allowing them to transfer a call to another communication address, or to a messaging service, or to recall automatically the caller when the called party is busy. However, such systems do not really take into consideration the caller, and are not suited for the handling of mobility and/or diversity of communication terminals.

Document EP 0 872 998 describes a data processing system dedicated for private telecommunications network users, for setting up communications between a terminal of a calling user and a communication terminal of a called user, each one of the said terminals being connected to this same private communications network. This system comprises:

storage means, suited for storing information data indicative of a communication address of a terminal of the calling user, and an accessibility status of such calling user through said terminal, interfacing means, designed in order to allow the calling user to request the setting-up of a communication with the called user, and management means that can read the information memorized in the storage means, in order to set up a communication between the communication terminal of the calling user and a communication terminal of the called user, taking into account the calling user's preferences, the called user's preferences, and the capabilities of their respective terminals.

Such a system can operate only within a single network, as it centralizes the information corresponding to all the subscribers between which communications are to be established. It cannot take into account the preferences of both the calling user and the called user, if the two subscribers belong to companies operating their respective distinct private telecommunications networks.

The purpose of the invention is therefore to solve this issue, notably by allowing to take into account the preferences of both the calling user and the called user, when such users belong to distinct private networks.

With that in mind, the invention relates to a data processing system, dedicated to at least one users named as "the caller", and allowing to set up communications between one of the communication terminals used by this calling user and one of the communication terminals used by at least one said called user, such terminals being likely to be connected to potentially distinct communications networks, wherein such data processing system comprises:

storage means, suited for storing information data indicative of at least one communication address of a communication terminal of the calling user, and an accessibility status of such calling user through said terminal, interfacing means, designed in order to allow the calling user to request the setting-up of a communication with one or more called user, and management means in order to:
read the information memorized in the storage means,
set up a link with another data processing system, similar dedicated and at least to said called user,
and transmit information to the other data processing system, in order to negotiate with such other data processing system the setting-up of said communication between the calling user and the called user; such negotiation consisting notably in determining terminals according to the information read in the respective memorization means of the data processing systems dedicated respectively to the calling user and the called user.

The system according to the invention may include numerous additional features, that may be taken separately and/or in combination, particularly:

interfacing means that can be designed in order to allow the calling user to request the setting-up of a chosen communication according to one or more criteria, such as emergency level, type of communication, cost of communication and/or location of the called user. The management means are then designed so as to undertake the negotiation according to each of the criteria selected by the calling user;

storage means capable of storing information data, indicative of the calling user. In such way, some of the information data may be indicative of the calling user's rank within a corporation, or his accessibility through one of his terminals according to the day and/or time. In the later case, they may be determined by the management means;

storage means capable of storing information data, indicative of one or more called user, such as for example his accessibility status from one of his terminals, depending on the day and/or time;

management means capable of retrieving information data from the storage means included in the data processing system of a called user, so that such information gets stored within his own storage means;

management means capable of retrieving information data from databases;

interfacing means that can allow the calling user to make requests either by using a voice request, by typing on a keyboard, by selecting in a list, or also by pressing (a) key(s);

management means that may be designed, when they receive a communication set-up request originating from another data processing system, and accompanied by a selected criterion that cannot be met, in order to decide within the memorization means which terminal is likely to be accessed by the called user, and then to communicate to the other data processing system the information data which are indicative of the communication address of the selected terminal. In such case, upon reception of information data, indicative of a communication address of a terminal likely to be accessed by the called user, but not meeting the criterion, the management means are preferably designed so that they send to the calling user, through the interfacing means, a message proposing to set up the communication with such called terminal designated by the collected address;

management means that can be designed so as to set up a negotiated communication;

management means that can be designed so as to determine the status of the calling user's accessibility through his associated terminals, according to auxiliary data delivered by external means, such as for example activity detection data, or location detection data;

As an example, such data processing system can be implemented within a communication terminal, such as a fixed or mobile telephone, a personal digital assistant (PDA), a fax machine, a desktop or a laptop, or within a communication server, such as a voice server, a messaging or mail server, or also a firewall or proxy server.

The invention can be implemented within public communications networks such as PSTN, PLMN (e.g. GSM, GPRS, UMTS, or i-Mode), or Internet (IP) networks, as well as within private networks such as PABX or private communication gateways (<<Residential Gateways>>) that may use fixed or wireless access, such as WLAN or Bluetooth.

Other features and advantages of the invention may appear upon reading of the detailed description hereafter, along with the single drawing appendix that gives a simplified illustration of an example of communication devices equipped with processing systems according to the invention. Such drawing may be used not only to complete the invention, but also to contribute to its definition, where applicable.

In the example of the single drawing, we pictured a communication installation comprising three communications networks, of different types, interconnected by servers S1 and S2. More precisely, this example shows an installation comprising a first public data network, for example Internet/IP-based, connected by an access server S1 to a second public telephony network PTN, for example a PLMN (<<Public Land Mobile Network>>, such as GSM, GPRS, UMTS or i-Mode networks). However, an alternative may consist in having the second network to be a switched one, such as a PSTN (<<Public Switched Telephony Network>>).

Moreover, we hereby include a third, private network EN, propriety for example of a group of companies, and connected to the Internet/IP network through an IP router S2 having, preferably, a proxy or firewall functionality. This private network EN is, for example, a PABX (Private Automatic Branch Exchange) network, possibly wireless (if using the DECT standard). However, it could also be a WLAN (Wireless Local Access Network).

A number of user communication terminals U1 (i is here comprised between 1 and 3) may connect, if they are authorized, either to the private network EN or to the telephony network PTN, or indirectly to the InternetIP network through one of the two other networks EN and PTN, or also indirectly to the private network EN through the telephony network PTN and the Internet/IP network.

As pictured in the example, each user may use a minimum of two communication terminals. A first user U1, sitting in his office R1, within his company, is equipped with a mobile telephone T1, a fixed telephone FT1, connected to the private network EN, and a desktop computer C1, connected to the private network EN through connection means CM1, or a network connection, preferably high-speed, such as for example a switched Ethernet connection. However, any other type of connection may be considered, e.g. analog lines, ADSL, T0, T2, microwave, WLAN or Bluetooth.

A second user U2, sitting in his office R2, within his company (or his home office), is equipped with a mobile telephone T2 and a desktop computer C2, connected to the public telephony network PTN through connection means CM2, or a network connection, preferably high-speed, such as for example an ADSL modem. This second user U2 is for example a customer of the company employing the first user U1.

A third user U3, away from his home office R3, is equipped with a mobile telephone T3 and a laptop computer C3, connected to the public telephony network PTN through connection means CM3, or a network connection, preferably high-speed, such as for example an ADSL modem. This third user U3 is for example a service provider of the company employing the first user U1.

Of course, the network connections used by the computers C2 and C3 of the second user U2 and third user U3 may be of a totally different type, such as analog lines, switched Ethernet, T0, T2, microwave, WLAN or Bluetooth.

Of course, the invention is neither restricted to such example of a combination of a private network (EN), a public telephony network and a public data network (Internet/IP), nor to the selected number of networks. As a matter of fact, several private networks, several public telephony networks, and several public data networks may coexist (for example PSTN type, or PLMN—e.g. GSM, GPRS, UMTS or i-Mode).

Moreover, the invention is not restricted to terminals such as mobile telephones and desktop or laptop computers. Generally, it is directed to any type of communication terminal, capable of exchanging data with another terminal, e.g. fixed telephones, personal digital assistants (PDA), or fax machines.

According to the invention, each user Ui is associated with a data processing system Di, also called <<assistant>>, comprising a memory Mi, a <<man/machine>> interface Ii, and a management module Gi. Of course, an assistant D may be associated with several different users.

As pictured in the example, the assistant (or system) Di is either directly implemented in a user's computer, as it is the case with the first and second computers C1 and C2, or connected to a user's computer, as it is the case with the third computer C3. More precisely, in the case of the laptop C3 and the user U3, the assistant D3 is materialized by a dedicated box, with a wire (or wireless) connection to said laptop C3.

However of course, one or more assistants D could be implemented within a dedicated server, or one of the access servers to one of the networks, such as for example in the IP router S2 of the private network EN.

The purpose of the memory Mi of the system (or assistant) Di is to store the information data, indicative of one or more communication addresses of communication terminals associated with the user Ui, and if possible indicative of each communication address of each communication terminal associated with the user Ui. Each terminal address (phone number, electronic—or e-mail—address, URL, or similar) is stored within the memory Mi, associated with a status that indicates at any moment if such terminal can be accessed by the associated user Ui. In other words, by referring to the memory Mi, it is possible to know at any moment which terminal Ti or Ci may be used to reach a user Ui.

Such memory Mi may also contain many other information data, as can be seen further down, and notably data indicative of the user Ui, such as for example the name of the persons he usually calls, his preferred types of terminals for exchanging data or information, possibly according to their type, or also his usual office working hours, or any similar data.

The purpose of the system's (or assistant's) man-machine interface Ii is to allow a said <<calling>> user Ui to request the setting-up of a communication with at least one said <<called>> user Uj, after having connected to his assistant (or system) Di, for example by having sent a voice command to one of his communication terminals, or activated a dedicated key, or selected a dedicated menu from one of his communication terminals.

The connection with the assistant Di may be operated either through a communication link (to a predefined communication address) when the assistant Di is implemented within a terminal (or server) different from the one used by the calling user Ui to make his requests, or by direct coupling when the assistant Di is implemented within the terminal used by the calling user Ui to make his requests. The communication address of the assistant Di may be the single address known from the other users, or from the other user assistants, and allowing to reach the associated user Ui on any of his communication terminals.

A request may consist in providing a user (or company) name, or a communication address, such as for example a phone number or e-mail address.

The purpose of the man-machine interface Ii is therefore to convert the communication set-up requests, regardless of their format, in data that can be interpreted by the management module Gi as described hereafter. According to the realization mode of the communication terminal, the requests can be expressed orally, by typing on a keyboard or with a digital pen, by making a selection in a menu list, or by pressing one or more dedicated keys. Therefore, the conversion module of the interface Ii is designed according to the registration mode(s) for the requests, at the level of the terminals of the user Ui.

The management module Gi of the system (or assistant) Di is coupled with the interface Ii, which feeds it with the user's requests, and with the memory Mi. Its purpose is to negotiate with another data processing system Dj (and notably with its own management module Gj), dedicated to the called user Uj, the setting-up of the communication requested by the calling user Ui according to, at least, the information data which are stored within their respective memories Mi and Mj. In other words, when a calling user Ui requests his assistant Di to set up a communication with a called user Uj, the management module Gi of his assistant Di establishes a link with the management module Gj of the assistant Dj of the called user Uj.

As an example, such link is established over the Internet, but it may as well be established over other networks likely to transmit data packets: ISDN "D-Channel", X25 network, Frame Relay network, etc.

The management modules Gi and Gj then determine, each one on its side, within the memory Mi or Mj, the calling terminal (Ti or Ci) or called terminal (Tj or Cj) likely to be accessed by the calling user Ui or the called user Uj, depending on its accessibility status.

Such determination, during the negotiation phase, may also take into account one or more criteria provided by the calling user Ui, along with his communication set-up request, and/or predefined (or programmed). Potential criteria include, but not exclusively, the level (or degree) of emergency for the communication, the type of communication (text data, image data, sound data, multimedia data, etc.), the communication cost, and the location of the called user. As an example, the management module Gi of the assistants Di of users Ui belonging to a company may be configured so as to systematically give priority to a communication set-up request issued by a caller having the highest rank within the company.

Once that both management modules Gi and Gj have decided for a terminal, possibly according to one or more criteria, two alternatives may be considered. Either the terminals selected by the assistants Di and Dj of the calling user Ui and called user Uj comply with the request of the calling user Ui as well as with the potential criteria, or they do not.

If they are compliant, the management modules Gi and Gj initiate the communication set-up between the two calling and called terminals they respectively selected, for example by exchanging signalization messages. Of course, if the link does not require the called user's assistant Dj to be involved, only the assistant Dj of the calling user Ui initiates the communication set-up.

If they are not compliant, the negotiation continues only at the level of the management module Gi of the assistant Di of the calling user Ui. It may actually happen that the calling user Ui has requested his assistant Di to reach a called user Uj on a terminal Tj (or Cj), designated by its communication address, but that the assistant Dj of said called user Uj has stated that the accessibility status of said terminal Tj (or Gj) does not permit that. It may also happen that one or more selected accessible terminals do not comply with one or more of the criteria, for example because of their output or cost. Should such things occur, the management module Gi of the assistant Di is designed preferably so as to advise the calling user Ui that the called user Uj cannot be reached on his terminal Tj (or Cj), and/or that such terminal does not comply with the requested criteria, but that he may still be reached on another terminal Cj (or Tj), possibly provided that another condition is met, such as for example in case of emergency, or in the case of a strictly private, or strictly professional call.

If the calling user Ui accepts the proposal, the management module Gi advises the management module Gj, and both management modules Gi and Gj initiate the communication set-up between the two calling and called terminals they respectively selected, for example by exchanging signalization messages. Of course, if the link does not require the called user's assistant Dj to be involved, only the assistant Di of the calling user Ui initiates the communication set-up. On the other hand, if the calling user Ui refuses the proposal, it ends the attempt to request a communication set-up.

However, a management module Gi can undertake numerous other tasks, including but not exclusively:

analyzing private databases (open only for the user Ui, or for other users Uj subject to authorization), or shared databases;

analyzing the request of a calling user Uj upon request of his assistant Dj, in order to process it and then to send the appropriate response to said assistant Dj;

processing of notifications (messages or requests for locating its user Ui);

staying tuned with other assistants Dj, in order to store, preferably in a confidential manner (that is, not accessible for the user Ui), information relating to the users Uj associated with such assistants Dj (such as for example the lists of their communication terminals, their habits in terms of usage of terminal types, or their respective usual locations according to the day and/or time, and similar);

obtaining from other assistants Dj the location details of a user Uj its user Ui wishes to reach, and which it ignores;

advising other assistants Dj that a user Uj does not answer any more at the communication addresses that were associated to him, or that a user Uk does not have any assistant D, or that the assistant Dj of a user Uj is located in his computer Cj (or in his mobile phone Tj, or in a server, or in any other communication terminal), in order to allow an automatic update of the information for the entire group of assistants D;

locating its user Ui, using auxiliary data provided by external means, such as movement sensors or activity sensors at one or several terminals. It is actually possible to retrieve location data, such as for example when one goes through a gate using a pass, or using an ID card with a Bluetooth interface, or when switching on or off a communication terminal, etc., in order to determine the user's accessibility status.

Generally, it is worth having an assistant Di to act, using its management module Gi, as an <<expert system>> that enriches as time goes by, by learning and/or by gathering information data from its own environment and from the environment of other assistants it is in touch with, and/or by integration of new services or new features. Such behavior may be implemented using <<expert>> techniques, linked for example with databases and semantic tables specifically assigned to each assistant D.

Of course, it is also possible to consider having the processing systems (or assistants) Di not to be adaptive.

Each processing system D may be implemented through hardware (electronic circuits), or software, or a combination of hardware and software.

We shall now present a non exhaustive list of examples for the usage of assistants D within an installation as pictured in the single drawing.

Each one of the situations describes hereafter is initiated by the user U1, sitting in his office R1 and working on his desktop C1. It is therefore through a device connected to this desktop C1, such as a microphone (or using a keyboard), that the user U1 will advise that he wishes to access his assistant D1, for example by pronouncing the word <<assistant>> (or by providing the communication address of the assistant). In the present case, as the assistant D1 is implemented within the desktop C1, it is its man-machine interface I1 which advises the user, for example through a sound message delivered by the loud-speakers of the desktop C1, that his assistant D1 is ready to receive a request.

In a first example, the user U1 asks his assistant D1 to reach the user U2 in order to send him multimedia-type data, with no emergency. It is assumed, in this example, that the desktops C1 and C2 of users Ui and U2 are configured to exchange multimedia data. As an example, this request could be done orally using the sentence <<I would like a multimedia communication with U2>>.

The man-machined interface I1 of the assistant D1 translates this request in workable data for the management module G1, which then establishes a link with the assistant D2 of the designated user U2. It then passes on the request to such assistant D2, using for example the format [U1, multimedia, normal priority, only if U2 is present in his office].

Upon reception of this request, the management module G2 of the assistant D2 queries the memory M2 to determine where its user U2 is located, and which terminal may reach U2. In this example, it is assumed that the user U2 is sitting in his office R2, working on his desktop C2 (configured for multimedia data interchange).

The assistant D2 may then, as an example, send a message to the user U2 (in text format, or synthesized voice) on his desktop C2, to advise him of the call and ask him if he accepts it or not.

In the event that the user U2 notifies his assistant D2 that he accepts the call, the management module G2 of the assistant D2 sends to the management module G1 of the assistant D1 a message, such as [approved, multimedia, desktop C2, proxy server S1].

The assistants D1 and D2 then exchange signalization messages, in order to initiate the setting-up of the link between the desktops C1 and C2, through the proxy access server S1.

In a second example, the user U1 also asks his assistant D1 to reach the user U2 in order to send him multimedia-type data, with no emergency. It is assumed, in this example, that the desktops C1 and C2 of users U1 and U2 are configured to exchange multimedia data, but that only the desktop C1 is functioning (C2 is switched off).

The man-machine interface I1 of the assistant D1 translates this request in workable data for the management module G1, which then establishes a link with the assistant D2 of the designated user U2. It then passes on the request to such assistant D2, using for example the format [U1, multimedia, normal priority, only if U2 is present in his office].

Upon reception of this request, the management module G2 of the assistant D2 queries the memory M2 to determine where its user U2 is located, and which terminal may reach U2. In this example, it is assumed that the user U2 is sitting in his office R2 and, as stated earlier, that his desktop C2 is switched off. As a consequence, the user U2 can be reached only on his mobile phone T2.

The assistant D2 then establishes a link with the mobile phone T2 in order to advise his user U2, for example by a synthesized voice message, or an SMS (but it could also be done by sending a fax), that the user U1 wishes to set up a multimedia-type of communication with him. Simultaneously, the assistant D2 advises the assistant D1 that the user U2 is not ready yet, but that he was informed of the call request.

The assistant D1 informs the user U1, for example through a synthesized voice message or text message. Then, in the event that the user Ui accepts to switch on his desktop C2, the management module G2 of the assistant D2 sends to the management module G1 of the assistant D1 a message, such as [approved, multimedia, desktop C2, proxy server S1].

The assistants D1 and D2 then exchange signalization messages, in order to initiate the setting-up of the link between the desktops C1 and C2, through the proxy access server S1.

In a third example, the user Ui asks his assistant D1 to reach the user U3 in order to send him multimedia-type data, with no emergency. It is assumed, in this example, that the desktop C1 and the laptop C3 of users U1 and U3 are configured to exchange multimedia data, but that only the desktop C1 is functioning (C3 is switched off).

The man-machine interface 11 of the assistant D1 translates this request in workable data for the management module G1, which then establishes a link with the assistant D3 of the designated user U3. It then passes on the request to such assistant D3, using for example the format [U1, multimedia, normal priority, only if U3 is present in his office].

Upon reception of this request, the management module G3 of the assistant D3 queries the memory M3 to determine where its user U3 is located, and which terminal may reach U3. In this example, it is assumed that the user U3 is traveling, and that he may be reached only on his mobile phone T3, subject to the call being both urgent and for professional purposes.

The assistant D3 then transmits to the assistant D1 the call number (06 XX XX XX XX) for the mobile phone T3, specifying that the user U3 may be reached on this one, subject to the call being both urgent and for professional purposes.

The assistant D1 immediately informs the user U1, for example through a synthesized voice message or text message. Then, if the user U1 advises his assistant D1 that the call is actually urgent and for professional purposes, the management module G1 advises the user U1 that it makes an attempt to set up a link between his fixed telephone FT1 and the mobile phone T3 of the user U3. Of course, it is possible to consider having the management module G1 to propose to the user Ui to use another of his communication terminals, such as his mobile phone T1. Here, the fixed telephone FT1 is proposed to the user U1, because it is his preferred communication terminal when he is sitting in his office, particularly for calls with a professional purpose.

The assistants D1 then initiates the setting-up of the link between the fixed telephone FT1 and the mobile phone T3, preferably without the number of the telephone T3 being displayed on the screen of FT1.

The above described examples are all about a request initiated by a user Ui, using a communication terminal Ci in which an assistant Di is implemented. However, it is also possible to initiate a request using a terminal Ti distant from the terminal or server in which the assistant Di is implemented. In such case, it is actually sufficient to establish a link between the initiating terminal Ti and the terminal or server equipped with the assistant Di.

The invention may be also considered as a data processing method, aiming to allow the setting up of communications between one of the communication terminals (Ti, Ci, FTi) used by a calling user Ui, and one of the communication terminals (Tj, Cj, FTj) used by at least one called user Uj, such terminals being likely to be connected to potentially distinct communications networks.

Such method may be implemented using processing systems D as described above. As the main and optional functions and sub-functions, ensured by the steps of such method, are roughly similar to those ensured by the different means that make up the processing systems D, only the steps implementing the main functions of the method according to the invention will be summarized hereafter.

Such processing method consists in the following:
  store (i) first information data, indicative of one or more communication addresses of communication terminals (Ti,Ci,FTi) of the calling user Ui, and of an accessibility status of this calling user Ui from each terminal, and (ii) second information data, indicative of at least one or more communication addresses of communication terminals (Tj,Cj,FTj) of the called user Uj, and of an accessibility status of this called user Uj from each terminal,
  request the setting-up of a communication between the calling user Ui and the called user Uj, and
  negotiate, according to a least the stored first and second information data, the setting-up of the requested communication between two terminals that can be respectively accessed by the calling user Ui and the called user Uj.

The invention is not restricted to the realization modes of a processing system D and a communication terminal or server as described above, only for illustration purposes, but covers any variation that the man of the art might think of, in the scope of the claims hereafter.

As a matter of fact, the descriptions above referred to a communication installation comprising a private network, propriety of a company or group of companies, and connected to an Internet/IP type of network, such network being connected to a telephony network. However, the invention generally relates to all types of interconnected public or private networks.

Moreover, the described application included terminals which were desktops or laptops, and fixed or mobile telephones. However, the invention generally relates to any fixed or mobile device capable of exchanging data (multimedia, voice, image or text) with a communications network (of any type), including fax machines and personal digital assistants (PDAs).

Besides, we described an installation in which each user was associated with a processing system (or assistant) implemented within (or connected to) one of his communication terminals. However, the invention equally applies to the case where several processing systems are implemented within a network equipment, such as a server, or a dedicated equipment, or also within a dedicated box that can be connected to a server. In the same way, the invention equally applies in the case where a processing system is shared between several users.

Finally, we described examples in which a calling user tries to reach a single called user. However, the invention equally applies to situations where a calling user tries to reach multiple called users. In such case, the negotiation takes place between the different processing systems of the users involved.

The invention claimed is:

1. A data processing system which sets up communications between at least one communication terminal of a calling user and at least one communication terminal of at least one called user, such terminals being each connected to a communications network; said data processing system comprises:
  storage means for storing information data indicative of at least one communication address of a communication terminal of the calling user, and an accessibility status of said calling user through said terminal;
  interfacing means which allows said calling user to request the setting-up of a communication with said at least one called user; and
  management means dedicated to the calling user and performing the functions of:
    reading the information memorized in the storage means,
    setting up a link with another data processing system, similar and dedicated at least to the said called user, and
    transmitting information to the other data processing system, in order to negotiate with said other data processing system the set-up of the said communication between the calling user and the called user,
  wherein the negotiation comprises determining terminals according to the information in the respective memorization means of the data processing systems dedicated respectively to the calling user and the called user, and
  wherein the data processing system dedicated to the calling user is in a first private network, wherein the other data processing system dedicated to the called user is in a second private network, and wherein the first and second private networks are different.

2. The system according to claim 1, wherein said interfacing means are designed to allow said calling user to request the setting-up of a chosen communication according to at least one criteria, and wherein said management means are designed to undertake said negotiation according to the said criteria.

3. The system according to claim 2, wherein said criterion is chosen from a list comprising at least an emergency level, type of communication, cost of communication and/or location of the called user.

4. The system according to claim 1, wherein said storage means are suited for storing information data, indicative of said calling user.

5. The system according to claim 4, wherein some of said information data may be indicative of the position of said calling user within a corporation.

6. The system according to claim 4, wherein some of said information data is indicative of accessibility status of said calling user through a terminal, according to day and/or time.

7. The system according to claim 6, wherein said management means are designed to determine said information data indicative of the accessibility status of said calling user through a terminal, according to the day and/or time.

8. The system according to claim 1, wherein said storage means are suited for storing information data, indicative of at least one called user.

9. The system according to claim 8, wherein some of said information data are indicative of the accessibility status of said called user through a terminal, according to the day and/or time.

10. The system according to claim 1, wherein said management means are designed for retrieving information data from the storage means included in the data processing system of a called user, so that such information gets stored within said storage means.

11. The system according to claim 1, wherein said management means are designed for retrieving information data from databases.

12. The system according to claim 1, wherein said interfacing means are designed to allow said calling user to make requests chosen from a group comprising voice requests, requests by typing on a keyboard, requests by selecting from a list, and requests by pressing at least one key.

13. The system according to claim 2, wherein said management means, upon reception of a communication set-up request originating from another data processing system, and accompanied by a selected criterion that cannot be met, are designed to determine within said storage means the terminal likely to be accessed by a second called user where the second called user is the calling party in the communication between the processing data system and the other data processing system, and then to communicate to said other data processing system the information data indicative of a communication address of said terminal likely to be accessed by the second called user.

14. The system according to claim 13, wherein said management means, upon reception of said information data indicative of a communication address of a terminal likely to be accessed by the second called user and not meeting said criterion, are designed to send to a second calling user from said another data processing system, through said interfacing means, a message offering to set up a communication with said terminal that can be accessed by the second called user.

15. The system according to claim 1, wherein said management means are designed to determine the accessibility status of said calling user through one of the associated terminals, according to auxiliary data delivered by external means.

16. The system according to claim 15, wherein said auxiliary data are chosen from a group comprising at least activity detection data and location detection data.

17. A communication terminal on a communications network, wherein said terminal comprises the data processing system according to claim 1.

18. A communication server on a communications network, wherein said server comprises the data processing system according to claim 1.

19. The system according to claim 1, wherein the management means is remote from the other data processing system that comprises other management means.

20. The system according to claim 1, wherein the data processing system dedicated to the calling user is in the first private network, wherein the other data processing system dedicated to the called user is in the second private network.

21. A method of sets up communications between at least one communication terminal of a calling user and at least one communication terminal of at least one called user, the method comprising:
storing information data indicative of at least one communication address of a communication terminal of the calling user, and an accessibility status of said calling user through said terminal in a first storage area dedicated to the calling user;
allowing said calling user to request the setting-up of a communication with said at least one called user;
reading the information stored in the first storage area by a first manager dedicated to the calling user;
setting up a link with a second manager dedicated to the called user;
transmitting information to the second manager to negotiate with the second manager the set-up of the said communication between the calling user and the called user,
accessing by the second manager information stored in a second storage area dedicated to the called user; and
determining at least one terminal accessible to the calling user; and
establishing the connection if the determined terminal is compatible with the transmitted information,
wherein a first data processing system comprises the first manager and the first storage area and wherein a second data processing system comprises the second manager and the second storage area, and
wherein the first and second data processing systems belong to different private telecommunications networks.

22. The system according to claim 1, wherein the first private telecommunications network and the second private telecommunications network are connected by a server.

23. The system according to claim 1, wherein the storage means stores information of different types of communication terminals associated with the calling user.

* * * * *